US012300932B2

(12) United States Patent
Moll et al.

(10) Patent No.: US 12,300,932 B2

(45) Date of Patent: May 13, 2025

(54) REAR-LOADED TERMINAL POSITION ASSURANCE DEVICE FOR CRIMPED TERMINALS

(71) Applicant: TE Connectivity Services GmbH, Schaffhausen (CH)

(72) Inventors: Hurley Chester Moll, Middletown, PA (US); Clara Rhodes, Winston Salem, NC (US); Kevin John Peterson, Winston Salem, NC (US); Aaron James de Chazal, Troy, MI (US)

(73) Assignee: TE Connectivity Solutions GmbH (CH)

( * ) Notice: Subject to any disclaimer, the term of this patent is extended or adjusted under 35 U.S.C. 154(b) by 687 days.

(21) Appl. No.: 17/571,144

(22) Filed: Jan. 7, 2022

(65) Prior Publication Data

US 2023/0223721 A1 Jul. 13, 2023

(51) Int. Cl.

| | |
|---|---|
| ***H01R 13/514*** | (2006.01) |
| ***H01R 13/436*** | (2006.01) |
| ***H01R 13/639*** | (2006.01) |

(52) U.S. Cl.

CPC ....... *H01R 13/639* (2013.01); *H01R 13/4367* (2013.01)

(58) Field of Classification Search

CPC ............ H01R 13/4367; H01R 13/4368; H01R 13/4376; H01R 13/4378

See application file for complete search history.

(56) References Cited

U.S. PATENT DOCUMENTS

| | | | | |
|---|---|---|---|---|
| 4,984,998 | A * | 1/1991 | Duncan | H01R 13/6272 439/352 |
| 5,183,418 | A * | 2/1993 | Yamanashi | H01R 13/4368 439/752 |
| 9,570,899 | B2 * | 2/2017 | Tanaka | H02G 15/013 |
| 2001/0016458 | A1 * | 8/2001 | Kashiyama | H01R 13/4368 439/752 |
| 2004/0110427 | A1 * | 6/2004 | Shi | H01R 13/4367 439/752 |
| 2007/0105457 | A1 * | 5/2007 | Machida | H01R 13/4367 439/852 |
| 2013/0187870 | A1 * | 7/2013 | Nakaya | G06F 3/041 345/173 |
| 2023/0187869 | A1 * | 6/2023 | Tanaka | H01R 13/4367 439/752 |

* cited by examiner

*Primary Examiner* — Neil Abrams

(57) ABSTRACT

An electrical connector assembly includes a housing defining a front opening for receiving a mating connector in a mating direction, an electrical terminal arranged within an interior of the housing, and a terminal position assurance (TPA) device received within a rear opening of the housing in an installation direction. The TPA device includes a body defining a central opening for receiving a cable to be attached to the terminal, and an elastic element defined on a front end of the body. The elastic element includes a contact surface protruding from the front end of the body for engaging with the terminal in an installation direction of the TPA device. The contact surface engages with the terminal before the TPA device reaches an installed position within the housing in the installation direction.

22 Claims, 6 Drawing Sheets

REAR-LOADED TERMINAL POSITION ASSURANCE DEVICE FOR CRIMPED TERMINALS

FIELD OF THE INVENTION

The present disclosure relates to electrical connectors, and more particularly, to electrical connectors having terminal position assurance devices.

BACKGROUND

Electrical connector systems often suffer from assembly errors. These errors include, for example, the incorrect or insufficient insertion of terminals of the connector within a corresponding housing. As a result, electrical connectors often implement a terminal position assurance (TPA) device or component, which ensures that a partially seated terminal is detected during assembly or mating of the connector system. In this way, an operator may identify and remedy a terminal placement issue during the connector assembly or connector mating processes, avoiding connector damage and/or a failed or unreliable connection.

Given these benefits, the demand for connectors utilizing TPA components has increased. However, their implementation is not without drawbacks. For example, the use of TPA devices increases manufacturing and assembly costs, as well as overall connector complexity. Moreover, these components often take up significant space within the connector. This is particularly problematic when implementing TPA-type solutions into smaller and/or lower cost connectors, or into applications requiring relatively large gauge cables or wires, which limit the available room for one or more TPA devices.

Accordingly, there is a need for improved TPA devices for use in these applications, including devices suitable for use with larger gauge cables and/or in connectors with limited available space.

SUMMARY

In one embodiment of the present disclosure, an electrical connector assembly comprises a housing defining a front opening for receiving a mating connector in a mating direction, an electrical terminal arranged within an interior of the housing, and a terminal position assurance (TPA) device received within a rear opening of the housing in an installation direction. The TPA device includes a body defining a central opening for receiving a cable to be attached to the terminal, and an elastic element defined on a front end of the body. The elastic element includes a contact surface protruding from the front end of the body for engaging with the terminal in an installation direction of the TPA device. The contact surface engages with, and is elastically deformed by, the terminal before the TPA device reaches an installed position within the housing in the installation direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
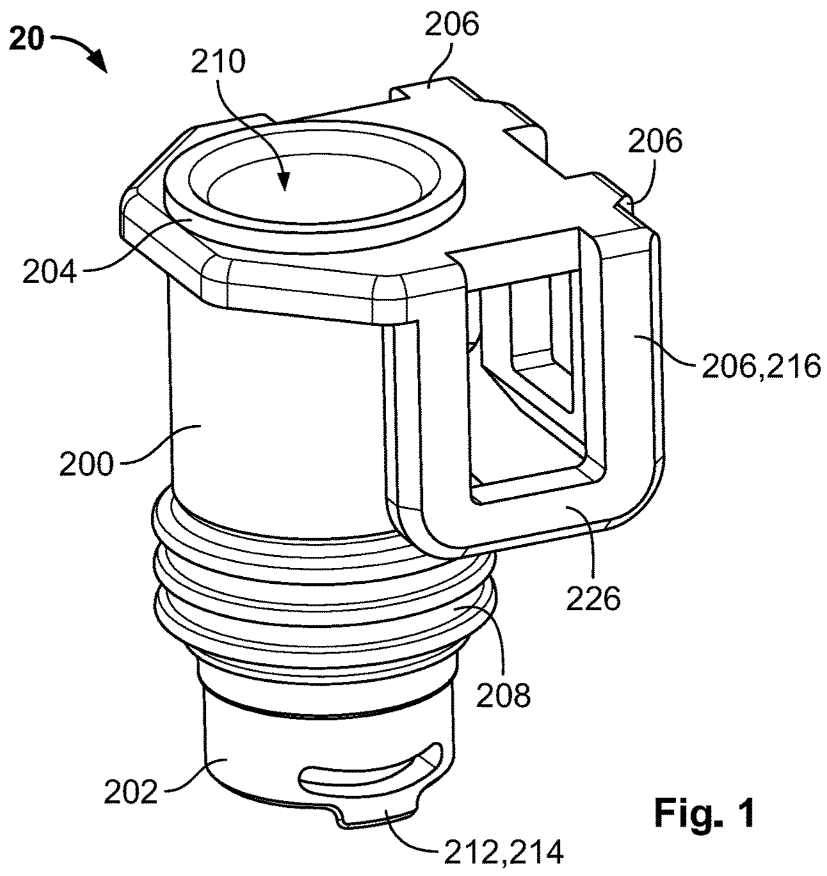
FIG. 1 is a perspective view of a TPA device according to an embodiment of the present disclosure.
Figure 2:
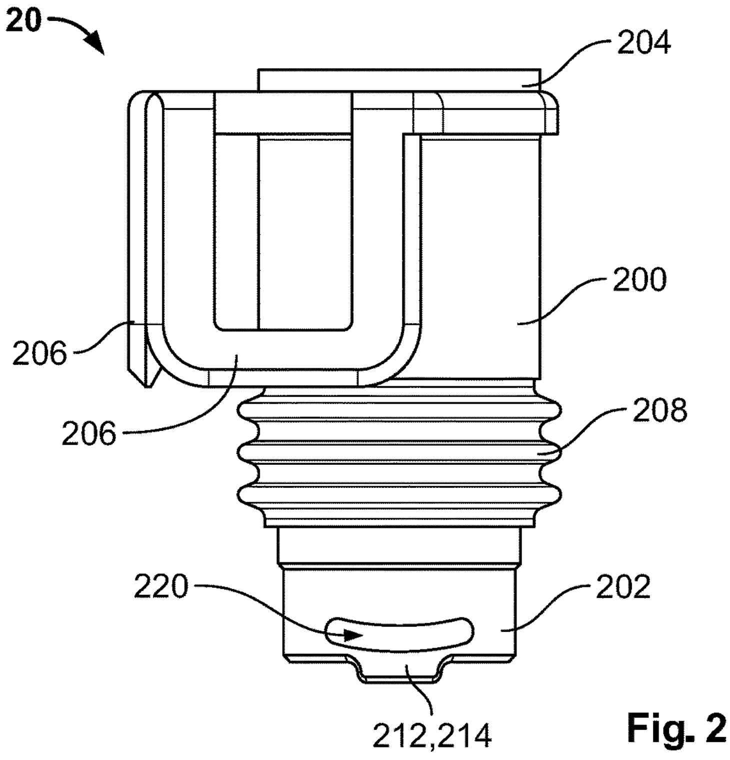
FIG. 2 is side view of the TPA device of FIG. 1.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include a rear-loaded terminal position assurance (TPA) device for use with an electrical connector. The TPA device comprises a body having an opening for receiving an electrical cable or an electrical wire therethrough, and an elastically-deformable front end for engaging with an electrical terminal fitted (e.g., crimped) to a free end of the cable. The TPA device further includes at least one elastic latch for securing the body to a housing of the connector in an installed position of the TPA device. During an insertion or installation operation of a terminal, cable and associated TPA device into the connector housing, the elastic front end of the TPA device is adapted to engage with the terminal and bias it into an installed position within the housing. Once the terminal is seated, further insertion force on the TPA device compresses the elastically-deformable front end, allowing the elastic latch to lock the TPA device in place relative to the connector housing, and ensuring that a pre-loading force is maintained on the terminal in the latched or locked position. Further, a sealing element is provided on the body of the TPA device for forming a seal between the body, and the connector housing and the cable. In this way, the TPA device further functions as a rear seal and/or wire cover of the connector, saving space and cost.

Embodiments of the present disclosure are shown and described in use with an exemplary electrical connector.

Figure 7:
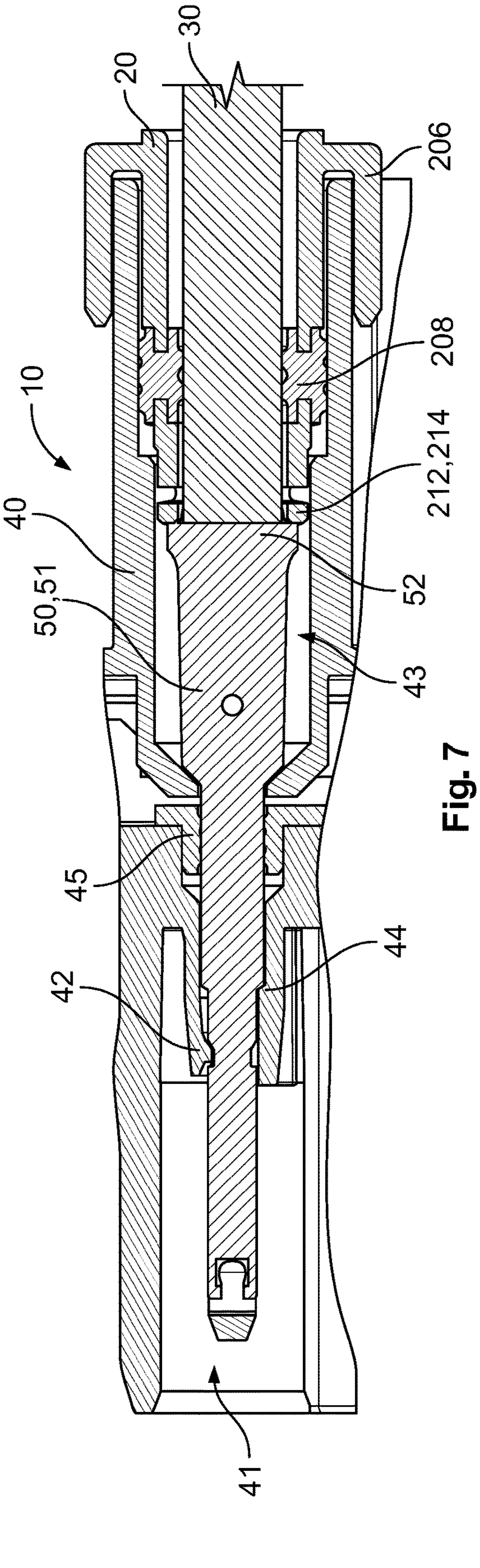
FIG. 7 is a cross-sectional view of a connector assembly including the TPA device, terminal and cable in an installed position within a connector housing according to an embodiment of the present disclosure.
Figure 10:
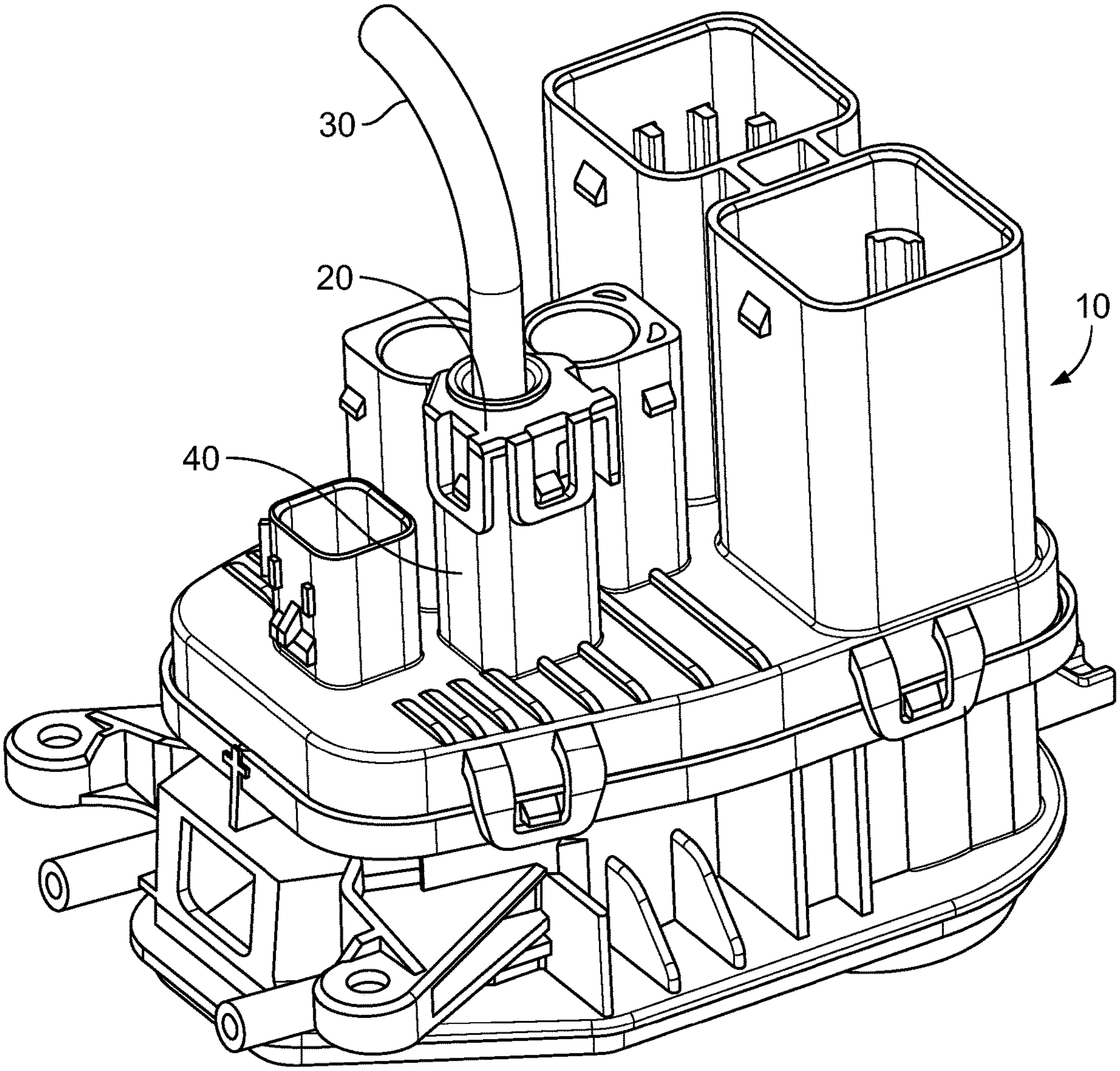
FIG. 10 is a perspective view of an exemplary connector assembly utilizing the TPA device according to embodiments of the present disclosure.

Specifically, referring to FIGS. 7 and 10, an exemplary electrical connector 10 (e.g., a charging receptacle or inlet for an electric vehicle) includes a housing 40. The housing 40 defines a front opening 41 for receiving a portion of a mating connector or a mating terminal (e.g., a charging plug, not shown) in a mating direction. The housing 40 further includes a rear opening 43 receiving at least one conductive electrical terminal 50 for mating with the corresponding mating connector or terminal. The terminal 50 may be crimped onto an end of a cable 30 prior to its insertion into the housing 40. The terminal 50 is installed into the rear opening 43 of the housing 40 in an insertion or installation direction generally opposite to the mating direction. In this way, the terminal 50 may be described as "rear-loaded" within the connector housing 40.

Figure 9:
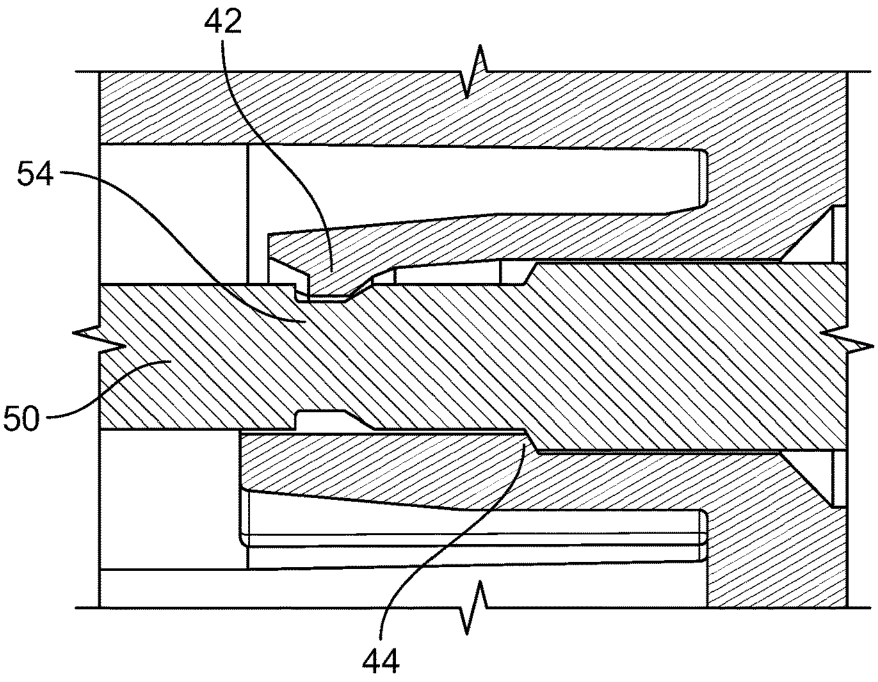
FIG. 9 is a partial cross-sectional view of the connector assembly of FIG. 7.

As shown in FIGS. 7 and 9, the housing 40 further defines a terminal seat 44 for abutting the terminal 50 in an installed position. In this way, the terminal seat forms a mechanical stop for fixing the insertion distance of the terminal 50 within the housing 40. An elastic terminal latch 42 of the housing 40 is adapted to engage with an annular groove 54 defined in the terminal 50 for preventing the removal of the terminal once in the illustrated installed position. Once installed, the terminal 50 may be sealed with respect to the housing 40 via an annular terminal seal 45. With the terminal 50 a least partially received within the housing 40, a terminal position assurance (TPA) device 20 pre-fitted over the cable 30 is inserted into the rear opening 43 of the housing 40 for ensuring proper seating and/or locking of the terminal 50 within the housing 40, as set forth in detail herein.

With particular reference to FIGS. 1-6, the TPA device 20 according to embodiments of the present disclosure comprises a body 200 defining a central opening 210 for receiving the cable 30 therethrough. In the illustrated embodiment, the body 200 and the opening 210 are generally cylindrical in shape, although other profiles are possible without departing from the scope of the present disclosure. The body 200 may be formed as a molded monolithic element, such as a molded polymer or plastic element.

Figure 8:
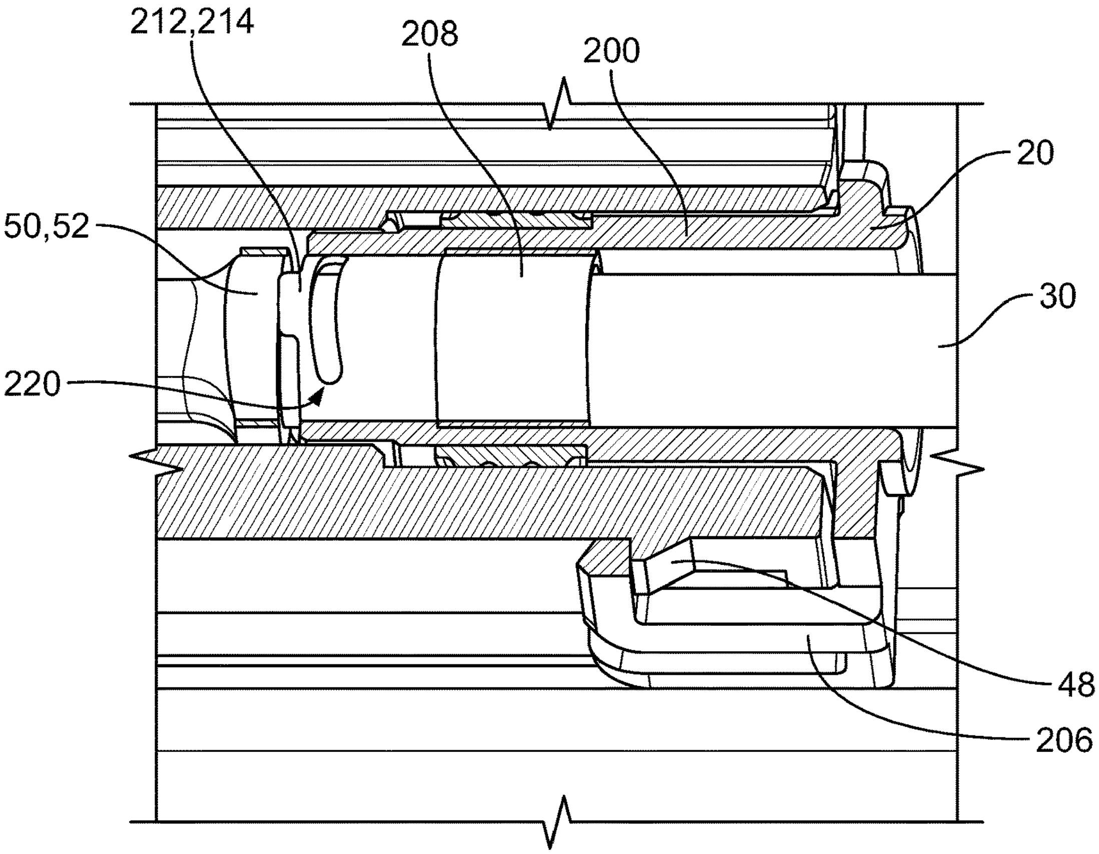
FIG. 8 is a detailed cross-sectional view of the connector assembly of FIG. 7 illustrating the terminal fixed in its installed position within the connector housing.

The TPA device 20 includes at least one locking feature or element 206 for securing the body 200 to the housing 40 in an installed position of the TPA device. In the illustrated embodiment, the locking element 206 includes at least one elastic latch formed on a rear end 204 of the body 200 for engaging with a complementary catch 48 formed on the housing 40, as shown in FIG. 8. Each locking element or latch 206 may include two cantilevered members 216 extending from the rear end 204 in an axial direction of the body 200, and a cross member 226 connecting the ends of the cantilevered members. The catch 48 of the housing 40 is adapted to be received within an opening defined between the members 216,226 in the installed position of the TPA device 20 within the housing. In the exemplary embodiment, as shown in FIG. 1, the TPA device 20 includes three locking elements or latches 206 arranged about its perimeter for more evenly distributing force on the body 200 (and thus the terminal 50) in the installed position within the housing 40.

Still referring to FIGS. 1-6, the TPA device 20 includes at least one elastic element 212,214,220 arranged on, or defined integrally with, a front end 202 of the body 200 for engaging with the terminal 50 in an installation direction of the TPA device 20. More specifically, the TPA device 20 includes a plurality of elastic elements (e.g., two) arranged symmetrically around the front end 202 of the body 200. In the exemplary embodiment, each elastic element includes a deformable beam 212 and a corresponding recess 220 formed on the front end 202 of the body 200.

Each beam 212 defines a contact surface 214 protruding therefrom in the axial direction of the body 200 for engaging with a radially-expanded flange 52 formed on an end of a crimping barrel 51 of the terminal 50. The beam 212 is elastically deformable by the terminal 50 in an axial direction opposite to the installation or insertion direction of the TPA device 20, and into the recess 220. The recess 220 may comprise an arcuate shaped channel extending radially-inward and through a sidewall of the body 200. The arcuate shape of the recess 220 may be convex with respect to the front end 202 of the body 200, with the contact surface 214 being generally centered with respect to the recess in a circumferential direction of the body.

While the exemplary beam 212 is supported on each of its ends by a remainder of the front end 202, a cantilevered beam or other elastically deformable structures may also be implemented without departing from the scope of the present disclosure. As illustrated, the beam 212 is formed integrally with (e.g., molded with) a remainder of the body 200. However, other embodiments may implement separate elastic elements attached to the front end 202 of the body 200 without departing from the scope of the present disclosure.

Figure 4:
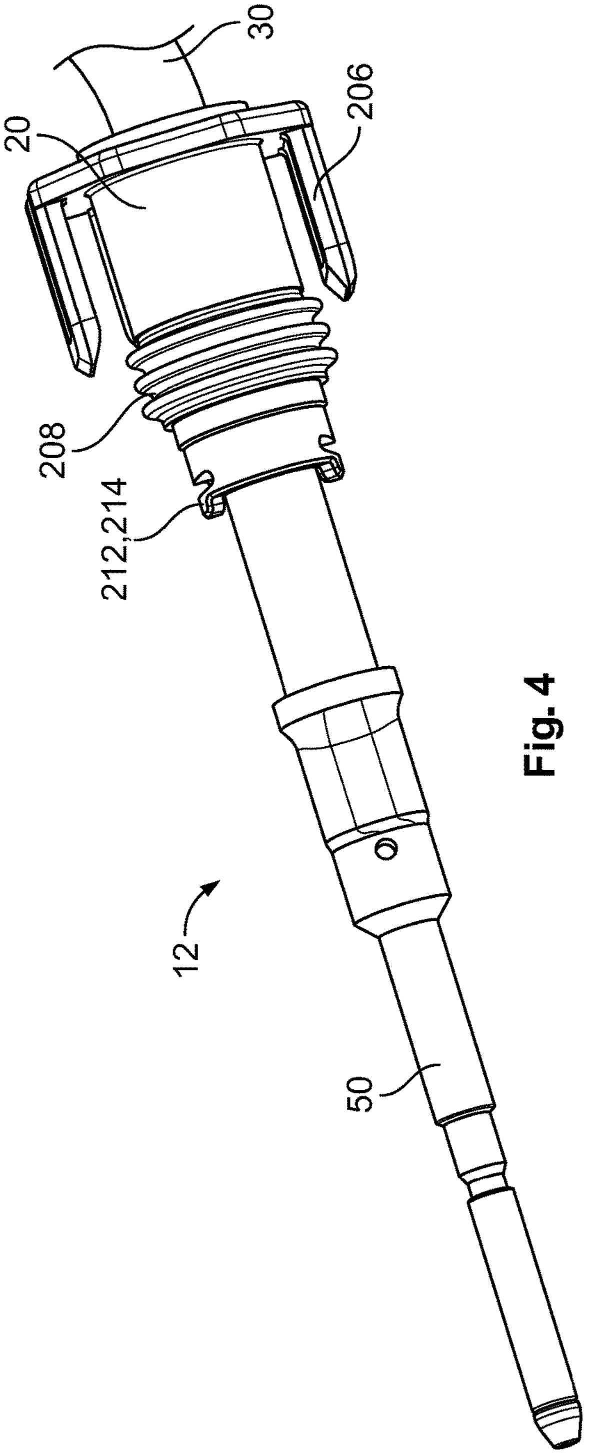
FIG. 4 is a perspective view of the TPA device according to FIGS. 1-3 inserted over a cable during a first step of an assembly process of a connector according to an embodiment of the present disclosure.
Figure 5:
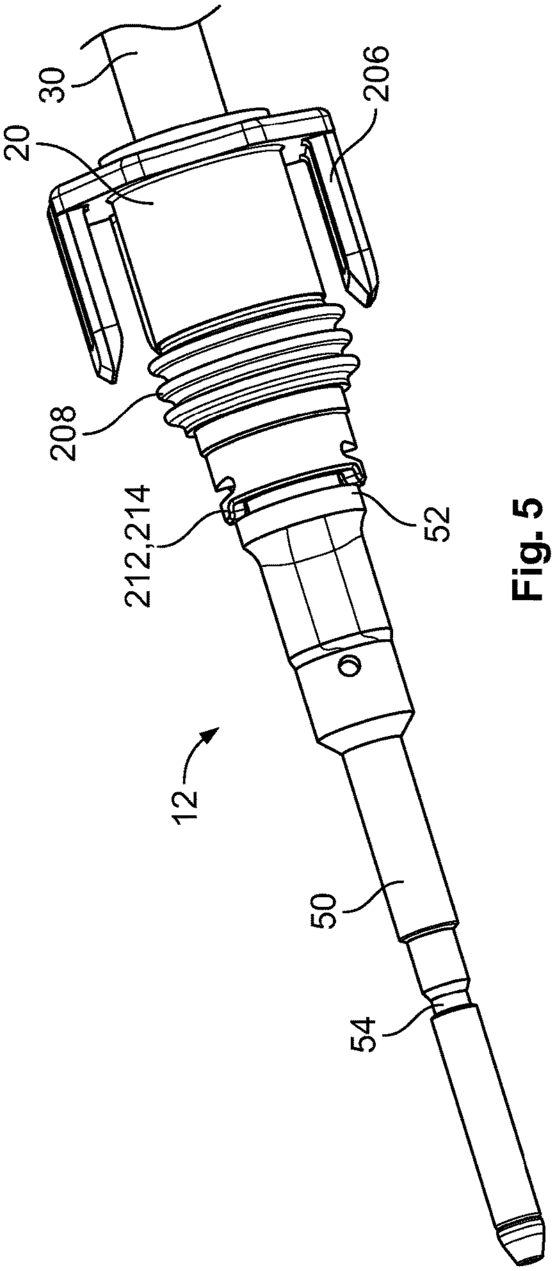
FIG. 5 is a perspective view of the TPA device of FIGS. 1-3 in an engaged position relative to a cable and an associated terminal prior to their insertion into a connector housing.
Figure 6:
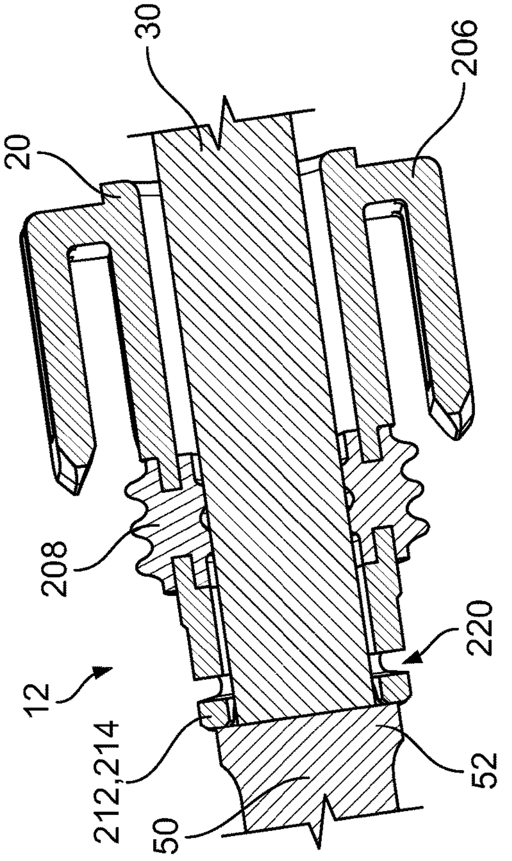
FIG. 6 is a detailed partial cross-sectional view of the TPA device, cable and terminal in the engaged position shown in FIG. 5.

As shown particularly in FIGS. 4-6, in one embodiment, during a subassembly step, the TPA device 20 may be installed over the cable 30, and the terminal 50 subsequently attached (e.g., crimped, soldered, etc.) to a free end of the cable. The resulting subassembly 12 may then be installed within the housing 40 of the connector 10 in the installation direction, as illustrated in FIGS. 7 and 11. As the subassembly 12 is inserted into the housing 40, the terminal 50 is biased into an installed or seated position as shown in FIGS. 7 and 9.

With the terminal 50 seated, the contact surface 214 of the beam 212 is adapted to abut and be compressed by the flange 52 of the terminal 50 before the TPA device 20 reaches the installed or locked position with the housing 40, as shown in FIGS. 7 and 8. More specifically, the elastic front end of the TPA device 20 is adapted to compress a predetermined amount in the axial or insertion direction prior to the engagement of the locking element(s) 206 with the housing 40. This ensures that consistent seating pressure is placed and maintained on the terminal 50 by the TPA device 20 during use.

Figure 3:
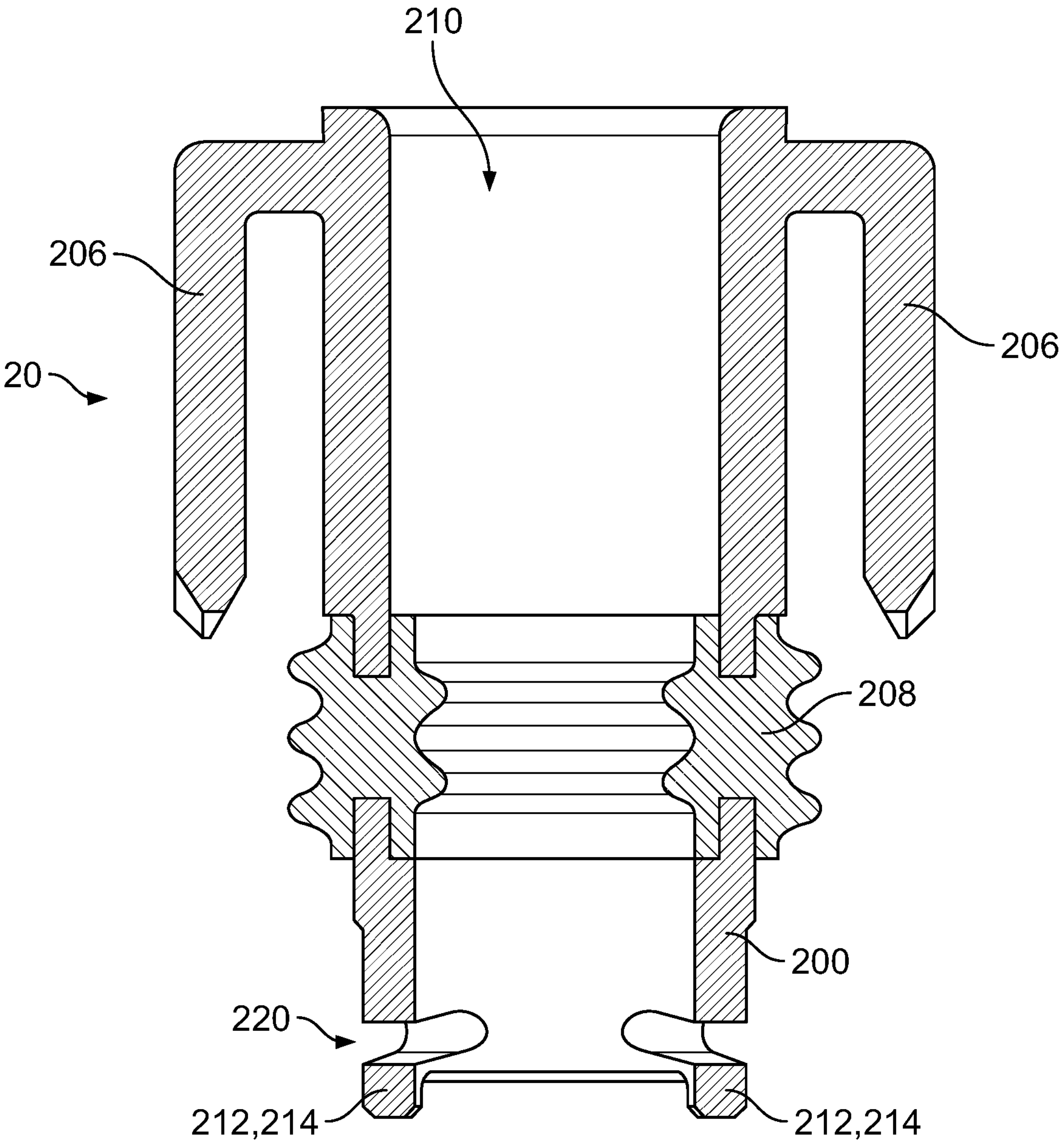
FIG. 3 is a front cross-sectional view of the TPA device of FIGS. 1 and 2.

The TPA device 20 further includes a ribbed sealing element 208 (e.g., an over-molded seal) forming a seal between at least one of the body 200 and an interior wall of the housing 40 or the body and an exterior of the cable 30 inserted through the body. In the exemplary illustrated embodiment, as shown in FIGS. 3, 6 and 7, the sealing element 208 extends in the radial direction through a sidewall of the body 200 for defining a seal between the body, and both the interior wall of the housing 40 and the exterior of the cable 30. The sealing element 208 includes a plurality of sealing ribs on both internal and external sealing surfaces for engaging with the cable 30 and the housing 40, respectively. In this way, the TPA device 20 defines a rear seal and/or wire cover of the connector 10, saving space and cost.

While the above embodiments describe a TPA device for use with a single terminal (i.e., one TPA device for each terminal), embodiments of the present disclosure may include a single TPA device configured for use with a plurality of terminals simultaneously. In these embodiments, the TPA device includes a single body defining a plurality of independently elastically-compressible ends insertable into a connector housing for engaging with a corresponding plurality of terminals.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An electrical connector, comprising:

a housing defining a front opening for receiving a mating connector in a mating direction, the housing adapted to receive at least one first electrical terminal for mating with a corresponding second electrical terminal of the mating connector; and a terminal position assurance (TPA) device received within a rear opening of the housing, including:

a body defining a central cable receiving opening;

a locking element securing the body to the housing in an installed position of the TPA device; and an elastic element arranged on a front end of the body being engageable with the first terminal in an installation direction of the TPA device, the elastic element includes a beam defined on the front end of the body, the beam being elastically deformable into a recess defined in the body in a direction opposite the installation direction of the TPA device.

2. The electrical connector of claim 1, wherein the housing further includes:

a terminal seat abutting the first terminal received within the rear opening of the housing; and a terminal latch securing the first terminal within the housing.

3. The electrical connector of claim 1, wherein the TPA device includes a sealing element forming a seal between at least one of the body and an interior wall of the housing or the body and an exterior of the cable inserted through the body.

4. The electrical connector of claim 3, wherein the sealing element extends through a sidewall of the body forming a seal between the body, and the interior wall of the housing and the exterior of the cable.

5. The electrical connector of claim 1, wherein the locking element includes at least one elastic latch formed on a rear end of the body being engageable with a complementary catch formed on the housing.

6. The electrical connector of claim 1, wherein the elastic element defines a contact surface protruding from the front end of the body being engageable with the first terminal in the installed position of the TPA device, the elastic element being elastically deformable by the first terminal in a direction opposite the installation direction of the TPA device.

7. The electrical connector of claim 6, wherein the elastic element is adapted to be deformed by the first terminal before the TPA device reaches the installed position with the housing.

8. The electrical connector of claim 1, further comprising a terminal seal arranged within the housing forming a seal between the terminal and an interior wall of the housing.

9. An electrical connector assembly, comprising:

a housing defining a mating connector receiving front opening;

an electrical terminal arranged within an interior of the housing; and a terminal position assurance (TPA) device received within a rear opening of the housing in an installation direction, the TPA device including:

a body defining a cable receiving central opening; and an elastic element arranged on a front end of the body, the elastic element including a contact surface protruding from the front end of the body being engageable with the terminal in the installation direction, the contact surface engaging with the terminal before the TPA device reaches an installed position within the housing.

10. The electrical connector assembly of claim 9, wherein the elastic element includes an elastic beam defined integrally in the front end of the body, the beam being elastically deformable into a recess defined in the body in a direction opposite the installation direction.

11. The electrical connector assembly of claim 10, wherein the elastic element includes a plurality of elastic beams arranged symmetrically around the front end of the body and extending in an axial direction of the TPA device.

12. The electrical connector assembly of claim 9, wherein the housing includes:

a terminal seat defining an insertion distance of the terminal inserted into the rear opening of the housing; and a terminal latch securing the terminal within the housing.

13. The electrical connector assembly of claim 9, wherein the terminal includes a flange defined on a non-mating end thereof, the elastic element engaging with the flange of the terminal as the TPA device is inserted into the rear opening of the housing.

14. The electrical connector assembly of claim 9, further comprising a cable extending through the body and having an end crimped to the terminal.

15. A terminal position assurance (TPA) device, comprising:

a body having a cable receiving cylindrical through hole, and an elastically-deformable end being engageable with an electrical terminal attached to the cable;

a sealing element arranged on the body forming a seal between the body and a connector housing receiving the TPA device; and an elastic latch securing the body to the connector housing in an installed position of the TPA device.

16. The terminal position assurance device of claim 15, wherein the elastically-deformable end includes a plurality of elastic beams arranged symmetrically around a front end of the body and protruding in an axial direction of the TPA device.

17. The terminal position assurance device of claim 16, wherein each of the elastic beams is deformable into a respective recess defined in the body in a direction toward a rear end of the body.

18. The terminal position assurance device of claim 17, wherein each of the beams defines a contact surface protruding from the front end of the body for engaging with the electrical terminal.

19. The terminal position assurance device of claim 15, wherein the sealing element extends through a sidewall of the body for forming a seal between the body, and an interior wall of the connector housing and an exterior of the electrical cable extending through the body.

20. An electrical connector, comprising:

a housing defining a front opening for receiving a mating connector in a mating direction, the housing adapted to receive at least one first electrical terminal for mating with a corresponding second electrical terminal of the mating connector; and a terminal position assurance (TPA) device received within a rear opening of the housing, including:

a body defining a central cable receiving opening;

a locking element securing the body to the housing in an installed position of the TPA device;

an elastic element arranged on a front end of the body being engageable with the first terminal in an installation direction of the TPA device; and a sealing element forming a seal between at least one of the body and an interior wall of the housing or the body and an exterior of the cable inserted through the body.

21. The electrical connector of claim 20, wherein the sealing element extends through a sidewall of the body forming a seal between the body, and the interior wall of the housing and the exterior of the cable.

22. An electrical connector, comprising:

a housing defining a front opening for receiving a mating connector in a mating direction, the housing adapted to receive at least one first electrical terminal for mating with a corresponding second electrical terminal of the mating connector;

a terminal position assurance (TPA) device received within a rear opening of the housing, including:

a body defining a central cable receiving opening;

a locking element securing the body to the housing in an installed position of the TPA device; and an elastic element arranged on a front end of the body being engageable with the first terminal in an installation direction of the TPA device; and a terminal seal arranged within the housing forming a seal between the terminal and an interior wall of the housing.

* * * * *